United States Patent [19]

Cluniat et al.

[11] Patent Number: 4,502,076

[45] Date of Patent: Feb. 26, 1985

[54] SELECTIVE EFFICIENCY VIDEOFREQUENCY NON-LINEARITY CORRECTION DEVICE

[75] Inventors: Claude Cluniat; Joseph Delattre, both of Chatou, France

[73] Assignee: LGT Laboratoire General des Telecommunications, Chatou, France

[21] Appl. No.: 365,388

[22] Filed: Apr. 5, 1982

[30] Foreign Application Priority Data

Apr. 14, 1981 [FR] France ............................... 81 07459

[51] Int. Cl.³ .............................................. H04N 5/38
[52] U.S. Cl. ...................................... 358/160; 358/35
[58] Field of Search ............. 358/160, 166, 174, 21 R, 358/27, 35

[56] References Cited

U.S. PATENT DOCUMENTS

3,975,586  8/1976  Chow ................................... 358/160
4,305,090  12/1981  Hess ..................................... 358/27
4,388,638  6/1983  Dischert ............................... 358/27

Primary Examiner—Tommy P. Chin
Attorney, Agent, or Firm—Cushman, Darby & Cushman

[57] ABSTRACT

A selective efficiency (threshold) video frequency non-linearity precorrection device comprising a direct channel (wide band channel) and an auxiliary processing channel (selected frequency correction channel), are both coupled to an input receiving the video frequency signal. The auxiliary channel may comprise a low pass filter, an inverting amplifier, a nonlinearity corrector circuit selecting a range of the signal limited by thresholds added with suitable phase and amplitude to the signal transmitted by the direct channel so that the resulting signal has, with respect to the input video frequency signal, compression or expansion limited to the range thus selected and only for the low frequency components of this signal.

7 Claims, 14 Drawing Figures

SELECTIVE EFFICIENCY VIDEOFREQUENCY NON-LINEARITY CORRECTION DEVICE

BACKGROUND OF THE INVENTION

The invention relates to the correction of amplitude nonlinearity in a television transmitter and more particularly to a selective efficiency video frequency nonlinearity correction device.

The purpose of the amplitude correction device of the invention is to correct the low frequency nonlinearities introduced in the power stages of a television transmitter.

The principle of such correction is to introduce in the video frequency signal before intermediate frequency modulation and predistortion in the low part of the video frequency spectrum, complementary to that which is generated in the high frequency power stages.

To provide this precorrection, devices are known which establish the characteristic of reverse amplitude to that of the output stage by means of a threshold correction circuit, the correction being achieved by means of six to eight adjustment parameters for the definition of the precorrection characteristic to be sufficient: three to four action thresholds are for example fixed, associated with three or four slopes corresponding to the efficiency of the correction introduced at the threshold point. This precorrector circuit is inserted before intermediate frequency modulation into the video signal processing chain at a point where the amplitude of this signal is well defined, i.e. after alignment and automatic gain control.

This solution has disadvantages: the adjustments of the correction thresholds and slopes between two correction thresholds interfere with each other. In addition, the efficiency of the correction is constant whatever the frequency of the side modulation band, whereas, since image modulation takes place as an attenuated side band, distortion in the double band zone is twice of that similar distortion in the single band.

Other correction circuits may be provided in a television system for precorrecting the distortion so that the signal from the high frequency stages has suitable linearity. These systems may for example be threshold precorrectors acting at the intermediate frequency level (used especially when the video frequency signal is not available, for example in television retransmitters), differential gain correctors using an order 3 nonlinearity generator, or premodulation correction circuits.

Like the threshold correction circuit described above, none of these correction circuits are selective in frequency, and it is therefore not possible to modulate separately the amplitude/low frequency amplitude characteristics and at the frequency of the chrominance sub-carrier so to suitably precorrect the transmitted signal. Moreover, a correction device of the type using an order 3 nonlinearity generator only allows progressive amplitude correction: expansion from white to black for negative modulation or expansion from black to white for positive modulation.

For the transmission of the television image signal, an amplitude modulation transmission system of the type described in the French Pat. application No. 78 27255, in the name of the present Applicants, provides amplification through a device having two parallel channels, one for amplification of a reduced carrier signal with a class AB biased amplifier, and the other for the amplification of a pure carrier signal with a class C amplifier, the signals obtained being combined so as to obtain the amplified signal to be transmitted.

The class AB amplifier introduces distortion at low levels because of the nonlinearity of its transfer characteristic, its gain being higher for low levels. These low levels of the crossed-modulation modulated carrier, with reduced carrier, correspond to the mean levels of the video frequency signal. This distortion causes an expansion of the mean gray level not only with respect to white but also with respect to black. To precorrect such an amplitude distortion, it is necessary to be able to attenuate only the grays, without affecting the amplification of the whites or blacks.

The present invention is concerned with a correction device for resolving the prior art problems of expansion of the intermediate levels in a television transmitter by providing the solution of a frequency selective video frequency corrector circuit which is easy to adjust and which further allows the differential gain not to be affected. This correction circuit may be adapted for correcting any amplitude distortion, which might affect the video frequency signal at the output of the high frequency stages in the absence of such a circuit, whatever the type of modulation used in the transmitter.

SUMMARY OF THE INVENTION

The invention provides a selective efficiency video frequency nonlinearity correction device, for the precorrection of nonlinearity introduced into the video frequency signal in the high frequency stages of television equipment. The invention comprises a video frequency signal input connected to the input of a dispatcher having at least two outputs connected respectively to the input of a wide band channel and to the input of a low frequency correction channel, this correction channel comprising a low pass filter whose output is coupled to at least one threshold corrector circuit comprising means for selecting the level ranges to be corrected and associated amplitude adjustment means, the output of the corrector circuit being coupled to the output of the low frequency correction channel, the outputs of the wide band channel and of the correction channel being connected to two corresponding inputs of an output circuit combining the corresponding output signals so as to form a precorrected signal modified by nonlinearities complementary to those to be corrected.

BRIEF DESCRIPTION OF THE DRAWINGS

Exemplary embodiments of the present invention will be better understood and other features will appear from the following description with reference to the accompanying drawings.

DESCRIPTION OF THE PREFERRED EMBODIMENTS

Figure 1A:
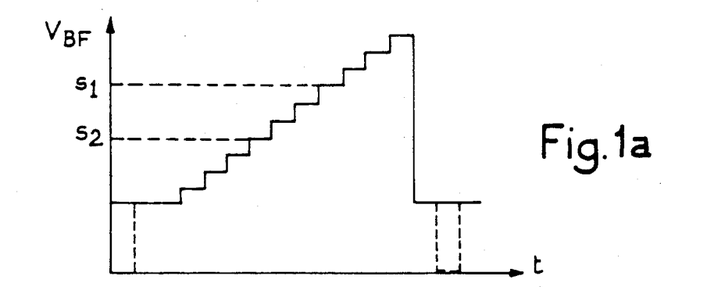
FIGS. 1a, 1b and 1c show signal diagrams illustrating the nonlinearity of the intermediate levels in a transmitter using reduced carrier amplitude modulation.

FIG. 1a shows a luminance test signal $V_{BF}$ applied to the video input of a transmitter. This signal comprises a timing pulse between 0 and 0.3 volt and a signal increasing in the form of stairs up to 1 volt.

Figure 1B:
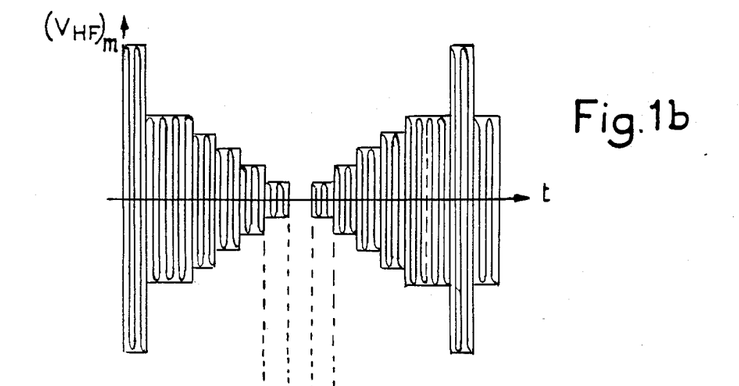

FIG. 1b shows a reduced carrier modulated signal $(V_{HF})_m$. Amplification thereof by means of a class AB amplifier, associated with amplification of the nonmodulated carrier by a class C amplifier considerably increases the efficiency.

Figure 2:
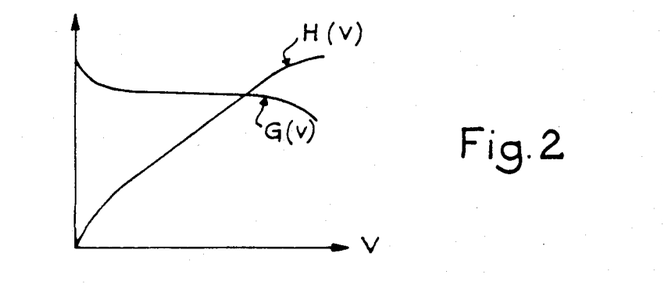
FIG. 2 shows the transfer characteristic, and the corresponding gain, as a function of the input level of a class AB amplifier.

However, because of the transfer characteristic H(V) and the gain variation G(V) which results therefrom, as shown in FIG. 2, the low modulation levels undergo expansion; these low levels correspond to the means grays of the video frequency luminance signal.

This non linearity causes excessive amplification of the mean levels and, in the demodulated video frequency signal, the central steps of the stairs corresponding to the grays have a greater amplitude than those corresponding to white or black.

Figure 1C:
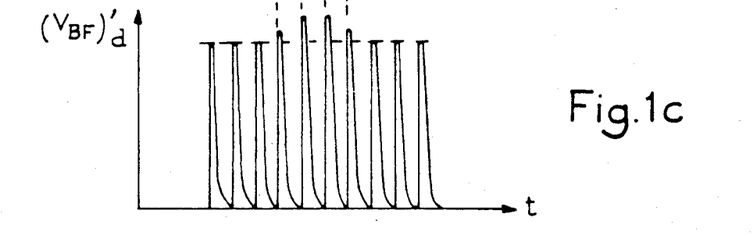

FIG. 1c shows this differentiated demodulated signal $(V_{BF})'_d$ to illustrate the level differences. This nonlinearity of the grays may be of the order of 10%.

Figure 3:
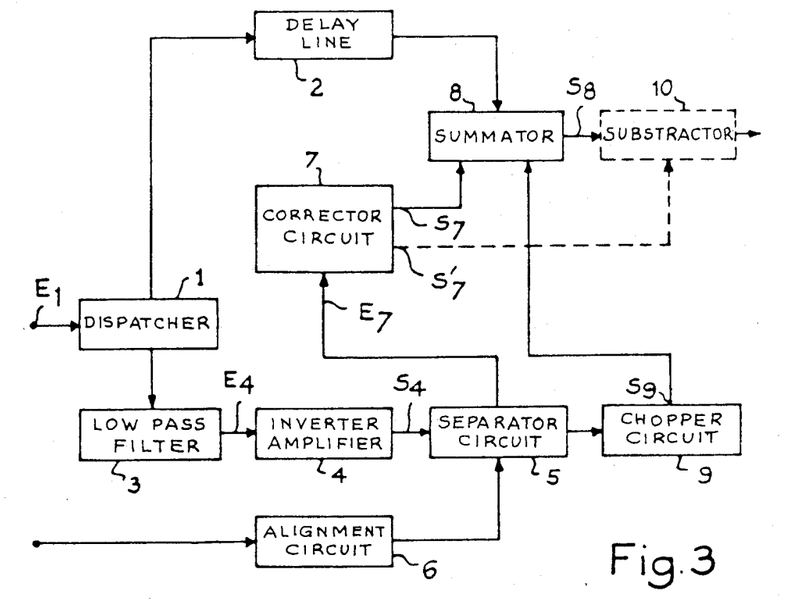
FIG. 3 is a block diagram of one embodiment of the correction device of the invention.

FIG. 3 shows the block diagram of the correction device inserted in the video frequency stages of television equipment, in accordance with the invention. This device comprises a video frequency signal input connected to the input of a dispatcher 1, this input being fed with the output signal from a timing separator circuit, not shown, which only transmits the video signal exclusive of the timing pulses. This signal is then split by dispatcher 1 into two channels. One so-called direct, wide band channel comprises principally a delay line 2 and a so called processing channel comprising in series a low pass filter 3 cutting off the frequency spectrum at 2.4 MHz for example, i.e. the double band transmitted signal. This low-pass filter 3 has its output connected to the input of an inverter amplifier 4 whose output is connected to the input of a separator circuit 5. This separator circuit further comprises a second input connected to the output of an alignment circuit 6 receiving pulses occurring during the timing signal intervals; this alignment defines the suppression level in separator circuit 5.

The delay introduced by delay line 2 of the wide band channel is equal to the delay introduced in the auxiliary processing channel, this delay being principally due to the low-pass filter 3.

The processing channel further comprises a corrector circuit particularly adapted to correction of expansion of the mean grays; this corrector circuit 7 is inserted between an output of separator 5 and an input of an output summator 8 whose first input is connected to the output of the delay line of the wide band channel.

With this corrector circuit 7 a part of the low frequency video frequency signal may be selected by means of a diode system. This selected signal, which has a reverse polarity to that of the corresponding part of the signal in the wide band channel because of the inverter amplifier 4, is added to the wide band signal transmitted by the principal channel in summator 8.

The form of this correction device allows the combination, with the video frequency nonlinearity precorrection function, of the limitation function of the video signal, such a limitation being necessary so that the modulation rate is not too great. For that, separator circuit 5 comprises a second output connected to the input of a chopper circuit 9 selecting the part of the signal which must be chopped. The output of this chopper circuit is connected to a third input of the output summator circuit 8. If the limitation threshold for high amplitude is set for example at 0.5 volt, when the signal at the video input does not exceed 0.5 volt, no signal appears at the output of chopper 9 and the video signal is fed as is to the output of summator 8 by the wide band channel. On the other hand, when the video signal at the input exceeds 0.5 volt, the output signal from the chopper is added to the video signal of the wide band channel to supply the limited video frequency signal at the output of summator 8 for feeding to the modulator. Because of the amplitude conditions provided in summator 8, a zero slope may be obtained after the limitation threshold. With this circuit for limiting high amplitudes, because it only deals with low frequency components of the spectrum, the amplitude and the phase of the signal carrying the chrominance information may be relatively maintained even for the levels which must be limited; the pass band of this chrominance signal may also be maintained with no introduction of disturbance if the input signal does not exceed the nominal amplitude of 0.5 volt for example.

Furthermore, the action threshold of the limiter is very sharp because the conduction characteristic of the chopper diode in the auxiliary processing channel is abrupt.

Figure 4:
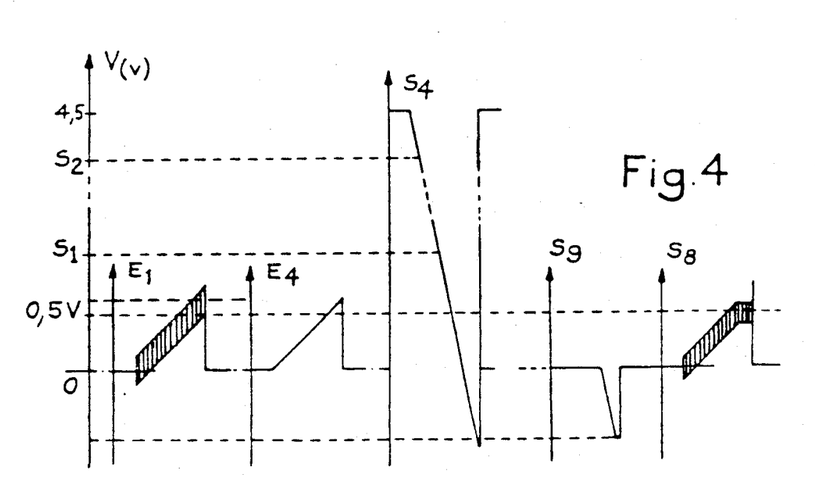
FIG. 4 is an explanatory signal diagram.

FIG. 4 shows the shape of the signals at different points of the device shown in FIG. 3 when the correction rate provided by the corrector circuit 7 is zero: the signal $E_1$ at the input of dispatcher 1, assumed to be a ramp for the luminance signal on which the chrominance sub-carrier is superimposed; signal $E_4$ at the input of the inverter amplifier 4, this signal no longer comprising the chrominance sub-carrier because of the low-pass filtering, signal $S_4$ at the output of amplifier 4; signal $S_9$ at the output of the chopper and signal $S_8$ at the output of summator 8. Signal $S_8$ is limited for high amplitudes of the video frequency signal, namely to white.

Figure 5:
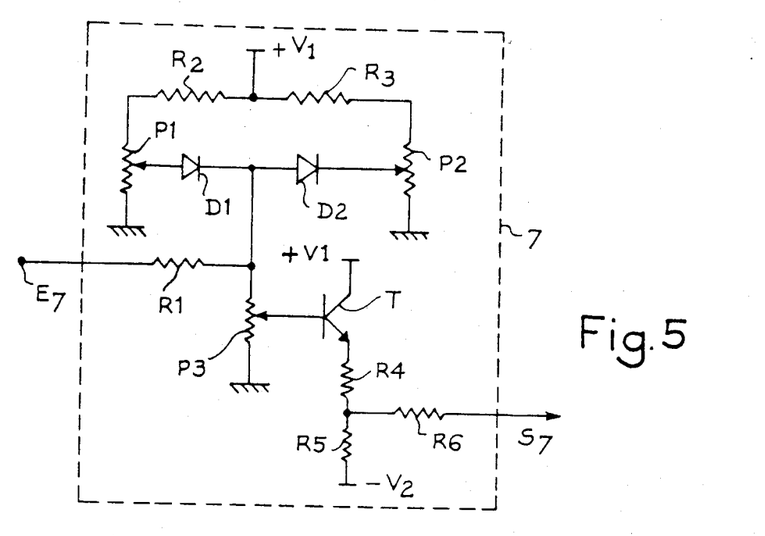
FIG. 5 is a first embodiment of a corrector circuit used in a device of the invention.

FIG. 5 shows a detailed embodiment of corrector circuit 7.

Input $E_7$ is connected through an input resistor $R_1$ to the common point between two diodes $D_1$ and $D_2$, the first one being forwardly and the second reversely connected, the other terminals of these two diodes being connected to the sliders of two potentiometers, respectively $P_1$ and $P_2$. These two potentiometers are connected both to ground and to the first terminals of two resistors, respectively $R_1$ and $R_2$, whose other terminals are connected to a positive potential point $+V_1$.

The terminal common to both diodes $D_1$ and $D_2$ and to resistor $R_1$ is further connected to a terminal of a potentiometer $P_3$ whose other terminal is connected to ground. The slider of this potentiometer $P_3$ is connected to the base of a pnp type transistor T whose collector is connected to the positive supply terminal $+V_1$ and whose emitter is connected to the negative supply terminals $-V_2$ through a resistor network $R_4$, $R_5$. The common point between these two resistors is connected through an output resistor $R_6$ to the output terminal of the corrector circuit $S_7$.

The output signal of inverter amplifier $S_4$ applied to the input $E_7$ of the corrector circuit, when the amplitude of the video input signal does not exceed the nominal amplitude, namely 0.5 volt, is variable between +4.5 volts and ground for example (FIG 4).

This circuit operates in the following way: the part of the signal higher than a threshold $S_2$ is chopped by diode $D_2$ and the part lower than a threshold $S_1$ is chopped by diode $D_1$. The chopping thresholds $S_1$ and $S_2$ are adjusted by means of potentiometers $P_1$ and $P_2$ whose sliders behave as voltage sources. A part of the correction signal is taken from the slider of potentiometer $P_3$ and fed to the common collector connected circuit formed by transistor T and resistors $R_4$ and $R_5$.

Figure 6A:
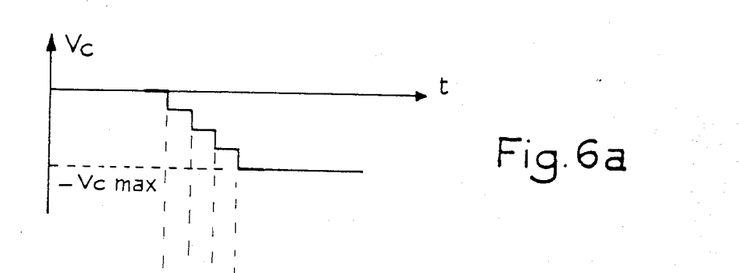
FIGS. 6a and 6b show signal diagrams illustrating the result obtained with a correction device comprising the corrector circuit shown in FIG. 5.
Figure 6B:
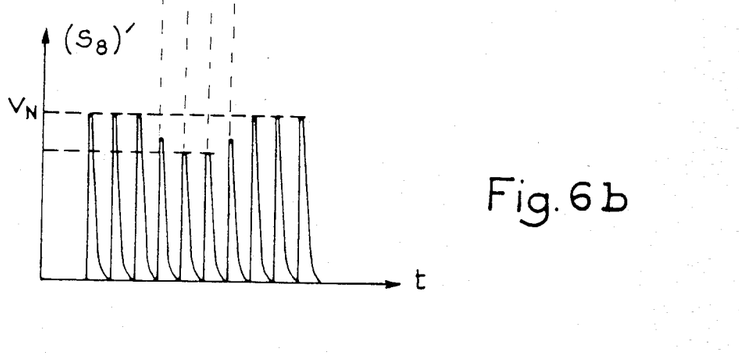

The summation of the correction signal thus obtained with the signal from the wide band channel available at the output of the delay line takes place through resistors $R_4$, $R_5$ and $R_6$ and the equivalent impedance of the circuit seen through the parallel delay line. When a signal such as $V_{BF}$ shown in FIG. 1a is applied to the video input $E_1$ of dispatcher 1 and when the thresholds $S_1$ and $S_2$ correspond to the levels respectively $S_1$ and $S_2$ (FIG. 1a), the corresponding chopped signal $V_C$ applied to the base of transistor T is shown in FIG. 6a and the output signal from the correction device $S_8$, after differentiation, is shown in FIG. 6b. It shows a limited compression at the intermediate levels which reaches 20% of the nominal amplitude $V_N$ of the staircase steps of the signal applied to the input.

Adjustment of the efficiency of the correction by means of potentiometer $P_3$ causes a variation in the amplitude of the output signal $S_8$. This variation is corrected in another stage of the transmitter, preferably downstream of the correction device, so as not to modify the setting of the correction thresholds and of the threshold for limiting to white. Thus, the modulation depth maintains a suitable value.

With this circuit, then, the range may be determined for the levels of the video frequency signal between the two thresholds $S_1$ and $S_2$ in which the correction will be effective.

The efficiency of the correction determined by potentiometer 3 is not limited. It may be adapted to the type of fault to be corrected. In a system for correcting amplitude nonlinearities for the mean grays, the fault is corrected by causing the video frequency signal to undergo a compression in the mean gray. Considering the nonlinearity rate in the signal, a maximum efficiency of 20% for the correction is largely sufficient for correcting the above-described fault.

But such a system may also be used for correcting for white or black signals by simply moving the thresholds by adjustment of potentiometers $P_1$ and $P_2$.

It is possible with a slightly more elaborate system, to act in several level ranges of the video frequency signal and to provide possible inversion of the direction of the correction so as to provide, in each range determined by the thresholds, expansion or compression of the video frequency signal for compensating respectively for compression or expansion of the video frequency signal in the high frequency stages.

Figures 7, 8A, 8B, 8C:
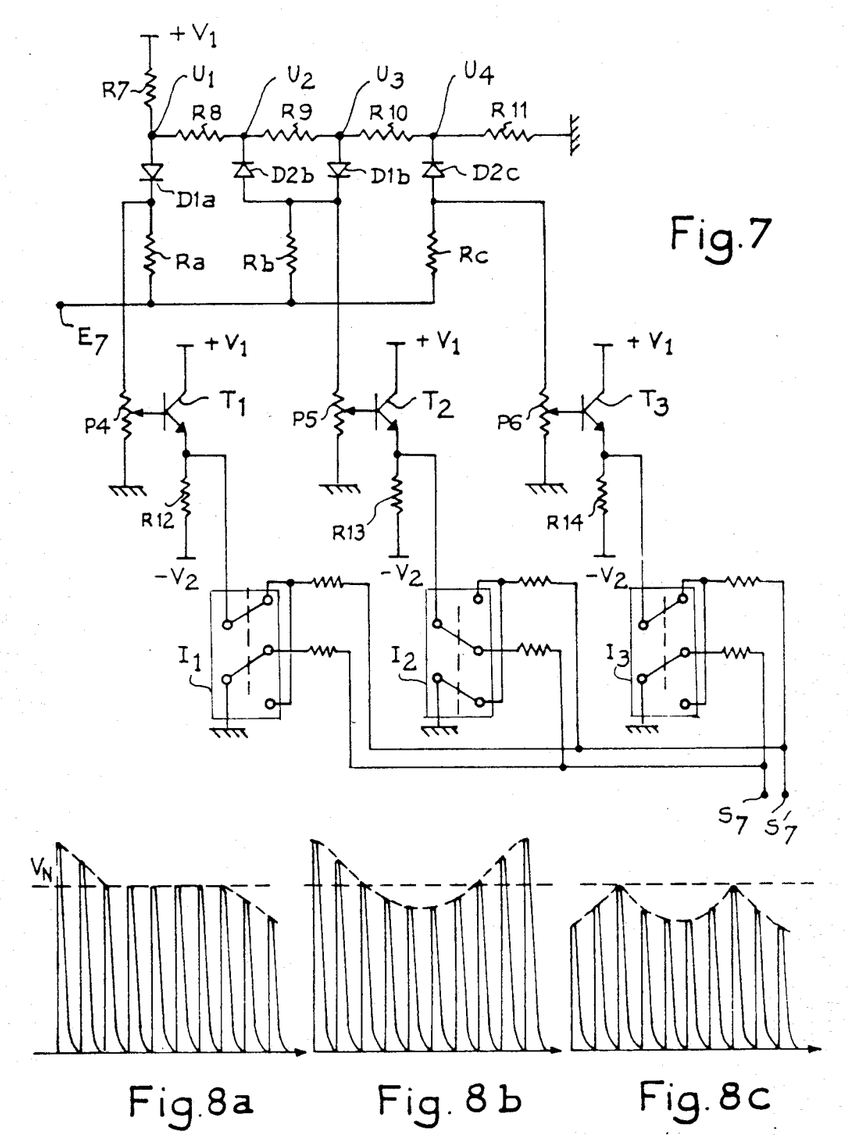
FIG. 7 is a second embodiment of a corrector circuit used in the device of the invention.
FIGS. 8a, 8b and 8c show signal diagrams illustrating the precorrection shapes obtained with a correction device comprising the correcting circuit shown in FIG. 7, for different adjustments.

FIG. 7 shows one embodiment of such a correction circuit in which three correction zones are determined, the efficiency of the correction in each of these zones being able to be adjusted independently of the set efficiencies in the other zones. The system further comprises inverting means for providing either compression or expansion for each of these zones.

In this embodiment, input $E_7$ of correction circuit 7 is connected through three input resistors $R_a$, $R_b$ and $R_c$ to limiting diodes $D_{1a}$, $D_{2b}$ and $D_{1b}$, $D_{2c}$. The second terminals of these diodes are connected to voltage sources $U_1$, $U_2$, $U_3$ and $U_4$ determined by resistors $R_7$, $R_8$, $R_9$, $R_{10}$ and $R_{11}$ connected in series between the positive supply source $+V_1$ and ground. Diode $D_{1a}$ chops the values of the video frequency signals less than threshold $U_1$, diode $D_{2c}$ chops the values greater than voltage $U_4$, diodes $D_{1b}$ and $D_{2b}$ chop the values respectively less than threshold $U_3$ and greater than threshold $U_2$. The chopped signals available at the second terminals of resistors $R_a$, $R_b$ and $R_c$ are fed to separator transistors $T_1$, $T_2$ and $T_3$ through efficiency adjustment potentiometers, respectively $P_4$, $P_5$ and $P_6$. Transistors $T_1$, $T_2$ and $T_3$ are common collector connected, their collector being connected to the positive supply terminal $+V_1$ and their emitters are connected to the negative supply terminal $-V_2$ through biassing resistors respectively $R_{12}$, $R_{13}$ and $R_{14}$. The correction signals available at the emitters of transtors $T_1$, $T_2$ and $T_3$ are fed to output terminals respectively $S_7$ and $S'_7$ through double switches $I_1$, $I_2$ and $I_3$. These output terminals $S_7$ and $S'_7$ are intended to be connected to different points of the device; terminal $S_7$ is connected as before to an input of summator 8, the result being a compression of the video signal in the corresponding zones; terminal $S'_7$ is connected to an input of a subtractor 10 shown with a broken line in FIG. 3, the result being an expansion of the video signal in the corresponding zones. As before, with potentiometers $P_4$, $P_5$ and $P_6$, the amplitude of the correction signal combined with a video signal may be proportioned to determine the efficiency of this correction. Switches $I_1$, $I_2$ and $I_3$, with their moving parts to ground, switch to ground the resistors which only transmit the correction signal so that there is no disturbance in the device. In fact, considering that the output impedance of the common collector circuits $T_1$, $T_2$ and $T_3$ is low (about 10 ohms) with respect to the values of the resistors which follow the inverters, the impedance at outputs $S_7$ and $S'_7$ corrected by the correction circuit remains constant whatever the position of the switches. Thus, the amplitude of the video signals is not disturbed.

With such a circuit, compression or expansion may be very simply achieved with adjustable efficiency in predetermined zones; adjustment of efficiency in each zone of action does not modify this zone of action itself and the adjustments of efficiency are independent of each other.

FIGS. 8a, 8b, 8c show examples of precorrected signals (after differentiation) able to be obtained at the output of the correction device for given adjustments and given positions of the double switches.

FIG. 8a shows an expansion in the black (first steps of the signal) and compression in the white (last steps of the signal), the intermediate levels not being modified, $V_N$ being the nominal level. FIG 8b shows expansion in the black, a compression in the gray and expansion in the white. The positions of the double inverters $I_1$, $I_2$ and $I_3$ in FIG. 7 correspond to this type of correction. FIG. 8c shows compression in the black, gray and white.

Since the improvement consists in providing two outputs which do not cause any disturbance, the sign of the correction applied in a given zone may be readily chosen by means of the inverters.

Such a circuit, like the first embodiment described with reference to FIG. 3, disturbs neither the differential gain nor the differential phase because it only acts on the video frequency filtered signal and not on the frequencies higher than the cut-off frequency of the low-pass filter, i.e. 2.4 MHz for example. The embodiment of the correction circuit described with reference to FIG. 7 is provided with three "correction cells". It is possible to increase the number of such correction cells so as to adapt the correction characteristic to the fineness of correction desired; in practice, a very accurate correction characteristic may be obtained with a system having six or seven cells.

In the device described with reference to FIG. 3, a low frequency channel has been shown, the output from this correction channel being combined with the output signal from the wide band channel so as to provide selective precorrection in the low frequency band of the video signal. It is possible to use a similar device for precorrecting the video frequency signal selectively in another frequency band, for example for correcting a linearity fault appearing only in the band of the chrominance sub-carrier. For that, the corresponding parts of the signal are selected by a band pass filter; the range of the levels to be corrected is selected as before by means of thresholds from the low frequency signal and the efficiency of the correction is adjusted by varying the amplitude of this signal. With this signal, the amplitude of the selected signal may be modulated within the band, these two signals being applied to the inputs of a modulator whose output signal is combined with the non-processed signal fed over the wide band channel. It is also possible to provide a precorrection device acting differently in several frequency bands.

Figure 9:
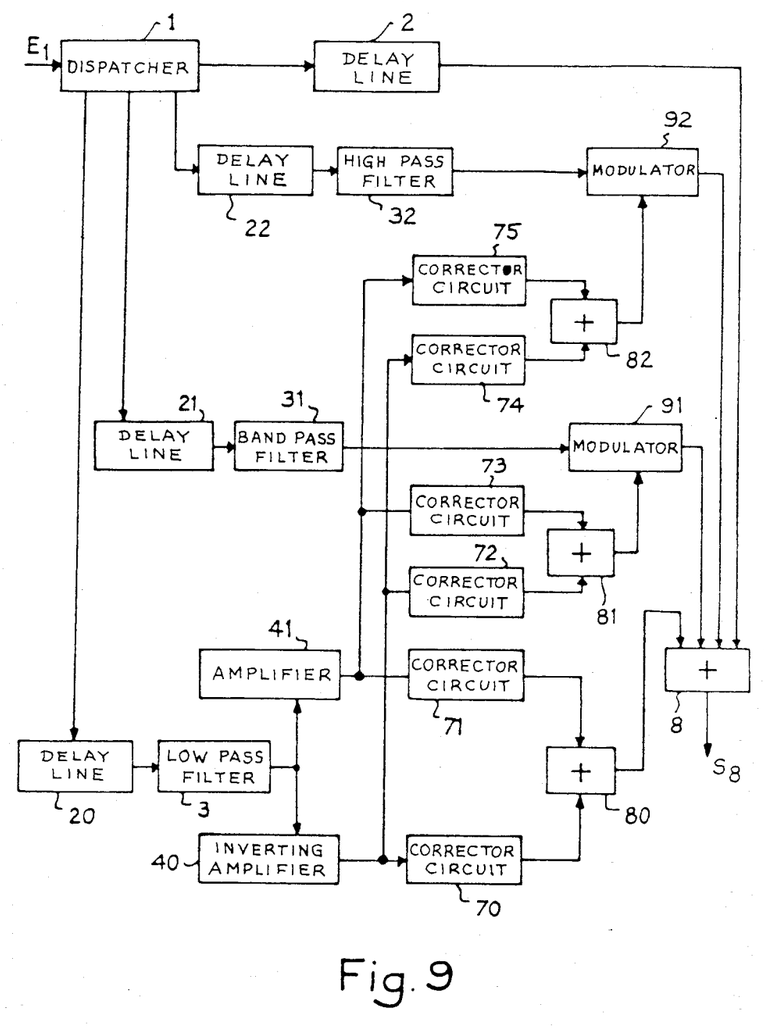
FIG. 9 is a block diagram of another embodiment of the precorrection device active in different frequency bands.

FIG. 9 shows an embodiment of such a selective efficiency precorrection circuit which is universal, i.e. covering selectively the whole frequency band of the video signal.

It comprises, like the one shown in FIG. 3, an input dispatcher 1 whose output is connected to a wide band channel having a delay line 2. The dispatcher also comprises three other outputs connected to the inputs of three selective correction channels, a low frequency one comprising a delay line 20 and a low pass filter 3 connected to an inverting amplifier 40 and a non-inverting amplifier 41. The outputs of these amplifiers are connected to threshold corrector circuits 70 and 71 whose outputs are connected to a summator 80.

The output signal of summator 80 is the precorrection signal to be superimposed on the signal from the wide band channel in the output summator 8, the part of this signal coming from the inverting amplifier forming a compression precorrection, whereas the part of the signal coming from the non-inverting amplifier forms an expansion precorrection.

A second correction channel, for medium frequencies, comprises a delay line 21, a band pass filter 31 connected to the first input of a modulator 91, for example a ring modulator. The second input of this modulator receives a modulation signal for modulating the amplitude of the signal selected by the band pass filter.

For this, the outputs of amplifiers 40 and 41 are connected to the inputs of two threshold corrector circuits 72 and 73 selecting for each correction direction the range of levels to be corrected for the medium frequency signal and allowing the efficiency of the correction to be adjusted. These two corrector circuits are connected to the inputs of a summator 81 whose output is connected to the second input of modulator 91, its output being connected to a third input of the output summator 8.

Similarly, a third "high" frequency correction channel comprises a delay line 22, a high pass filter 32 connected to a ring modulator 92 whose output is connected to the fourth input of the output summator 8. Two corrector circuits 74 and 75 are connected respectively to the inverting 40 and non-inverting 41 amplifiers, their outputs being connected to a summator 82 whose output is connected to the second input of modulator 92.

The delay lines placed in each of the channels are for correcting the shifts likely to occur between the channels because of the filters.

With such a correction device, the video signal can be acted on selectively for providing for example compression of the mean levels of the luminance signal, at the same time as an expansion of these same mean levels in the band of the chrominance sub-carrier or any other combination of expansion or compression with adjustable efficiency in the frequency bands determined by the filters.

This type of video frequency amplitude correction device with selective frequency efficiency is particularly applicable to television transmitters providing separate amplification of the carrier image and sound channels, or to television transmitters providing reduced carrier amplification in the image channel. But it may also be used in television transmitters with common amplification of the channels, as a complement to a third order intermodulation corrector.

In television transmitters using klystrons as power amplifiers, a correction circuit of the type described with reference to FIG. 7 is applicable for correcting so-called "S" distortions. Such a correction circuit may also be used in television cameras and in all equipment where processing of the video signal is required. Furthermore, the embodiment in which a single zone of action is selected to be used as a circuit for limiting in the white, by suitably choosing the values of the elements of the output circuit, $R_4$, $R_5$ and $R_6$ in FIG. 4.

What is claimed is:

1. A selective efficiency video frequency nonlinearity correcting device, for precorrecting nonlinearities introduced in video frequency signals in high frequency stages of television equipment:
    a video frequency signal;
    a dispatcher, receiving said video frequency signal, said dispatcher having at least two outputs connected respectively to the input of a wide band channel and to the input of a low frequency correction channel;
    wherein said correction channel comprises
        a low pass filter whose output is coupled to at least one threshold corrector circuit comprising means for selecting threshold ranges of signal levels to be corrected, and
        associated amplitude adjustment means coupled to said low pass filter for adjusting the amplitude of said low pass filter output, and
        the output of the corrector circuit is coupled to an output of said low frequency correction channel by a summator output circuit; and the outputs of the wide band channel and the correction channel are connected to two corresponding inputs of said summator output circuit such that combination of said two corresponding inputs forms a precorrected signal.

2. The device as in claim 1, further comprising:
a channel for correcting the relatively highest frequency components of the video frequency signal having an input connected to an additional output of said dispatcher, said high frequency correction channel comprising
  a high pass filter whose output is coupled to the signal input of a first modulator, and further comprising
  at least one threshold corrector circuit having its input coupled to the output of the low pass filter of said low frequency channel and its output coupled to a modulation input of said first modulator, wherein an output of said first modulator comprises the output of the high frequency correction channel, this output being coupled to an additional input of said summator output circuit.

3. The device as in claim 2, further comprising:
a channel for correcting the relatively medium frequency components of the video frequency signal, having an input connected to an additional output of said dispatcher, said medium frequency correction channel comprising
  a band pass filter whose output is coupled to the signal input of a second modulation, and further comprising
  at least one threshold corrector circuit having its input coupled to the output of the low pass filter of and low frequency channel and its output coupled to the modulation input of said second modulator, wherein an output of said second modulator comprises the output of the medium frequency correction channel, this output being coupled to an additional input of said summator output circuit.

4. The device as in claim 3, wherein:
the frequency bands of said three correction channels respectively for low, medium and high frequencies are contiguous so as to form a universal correction device.

5. The device as in claim 4, wherein:
each of said threshold corrector circuits comprise
  means for selecting at least one threshold signal level range to be corrected determined by thresholds, and
  means for adjusting the amplitude of the selected signal associated therewith to set the efficiency of the correction in the corresponding range.

6. The device as in claim 5, wherein:
said selection means comprise means for adjusting said thresholds; and wherein
said means for adjusting the efficiency of said correction act independently in each of said threshold corrector circuits.

7. The correction device as in claim 6, wherein:
a first corrector circuit selecting levels to be precorrected by amplitude expansion and a second corrector circuit selecting levels to be corrected by amplitude compression are associated with each of said correction channels; and
the low frequency correction channel comprises a non-inverting amplifier and an inverting amplifier connected to the output of said low pass filter, the outputs of said non-inverting and inventing amplifiers being connected respectively to inputs of said first and second corrector circuits whose outputs are connected to inputs of an adder for forming an overall correction signal, the output of said adder being connected to the output of its corresponding correction channel.

* * * * *